(12) United States Patent
Lee et al.

(10) Patent No.: US 9,848,128 B2
(45) Date of Patent: Dec. 19, 2017

(54) PHOTOGRAPHING APPARATUS AND METHOD FOR CONTROLLING THE SAME

(71) Applicant: SAMSUNG ELECTRONICS CO., LTD., Suwon-si, Gyeonggi-do (KR)

(72) Inventors: Tae-hee Lee, Seoul (KR); Kyoung-hwan Moon, Yongin-si (KR); Kwon-jeong Kang, Gunpo-si (KR); Hee-chul Han, Suwon-si (KR); Jae-gon Kim, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 99 days.

(21) Appl. No.: 15/063,751

(22) Filed: Mar. 8, 2016

(65) Prior Publication Data
US 2017/0054911 A1    Feb. 23, 2017

(30) Foreign Application Priority Data
Aug. 17, 2015    (KR) .................. 10-2015-0115540

(51) Int. Cl.
*H04N 5/232* (2006.01)
*H04N 5/225* (2006.01)

(52) U.S. Cl.
CPC ....... *H04N 5/23293* (2013.01); *H04N 5/2258* (2013.01); *H04N 5/2257* (2013.01)

(58) Field of Classification Search
CPC . H04N 5/2257; H04N 5/2258; H04N 5/23293
See application file for complete search history.

(56) References Cited

U.S. PATENT DOCUMENTS

| 8,416,282 B2* | 4/2013 | Lablans | G03B 5/00 |
| | | | 348/36 |
| 8,803,944 B2* | 8/2014 | Lablans | G03B 37/00 |
| | | | 348/36 |

(Continued)

FOREIGN PATENT DOCUMENTS

| JP | 2013-162348 | 8/2013 |
| KR | 10-2014-0060760 | 5/2014 |

(Continued)

OTHER PUBLICATIONS

Search Report and Written Opinion dated Aug. 16, 2016 in counterpart International Patent Application No. PCT/KR2016/002703.

*Primary Examiner* — Amy Hsu
(74) *Attorney, Agent, or Firm* — Nixon & Vanderhye, P.C.

(57) ABSTRACT

A photographing apparatus is provided. The apparatus includes a first buffer configured to store a plurality of images generated by a first camera module among a plurality of camera modules, a second buffer configured to store a plurality of images generated by a second camera module among the plurality of camera modules, a display configured to display an image generated by the first camera module as a live image, and a controller configured to analyze the images stored in the first buffer and the second buffer using at least one of image information of each image stored in the first buffer and the second buffer and photographing information of the plurality of camera modules, and in response to an event occurring in at least one of the plurality of images stored in the second buffer, to control the display to provide a state notification service on the second camera module. When a foreign substance appears on at least one of the plurality of camera modules, the photographing apparatus may notify a user of the state more intuitionally.

20 Claims, 14 Drawing Sheets

(56) References Cited

U.S. PATENT DOCUMENTS

| | | | |
|---|---|---|---|
| 8,810,627 B1* | 8/2014 | Cho | H04N 5/2258 |
| | | | 348/38 |
| 9,247,223 B2* | 1/2016 | McCrackin | H04N 9/735 |
| 9,253,397 B2 | 2/2016 | Lee et al. | |
| 9,282,222 B1* | 3/2016 | Karakotsios | H04N 5/772 |
| 9,578,246 B2* | 2/2017 | Kim | H04N 5/23293 |
| 2006/0187322 A1* | 8/2006 | Janson, Jr. | H04N 5/2251 |
| | | | 348/240.99 |
| 2007/0201726 A1 | 8/2007 | Steinberg et al. | |
| 2009/0262125 A1 | 10/2009 | Swaminathan et al. | |
| 2012/0105579 A1* | 5/2012 | Jeon | H04N 5/2258 |
| | | | 348/38 |
| 2014/0132735 A1 | 5/2014 | Lee et al. | |
| 2015/0220295 A1 | 8/2015 | Kim et al. | |
| 2015/0304557 A1 | 10/2015 | Choi | |

FOREIGN PATENT DOCUMENTS

| | | |
|---|---|---|
| KR | 10-2014-0062801 | 5/2014 |
| WO | 2014/172530 | 10/2014 |

\* cited by examiner

FIG. 1A
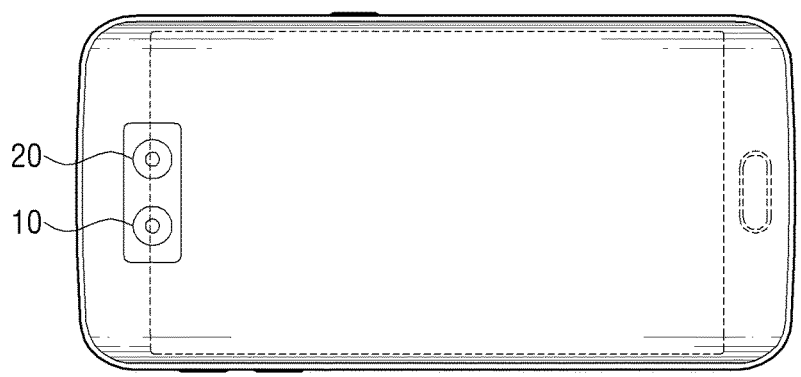
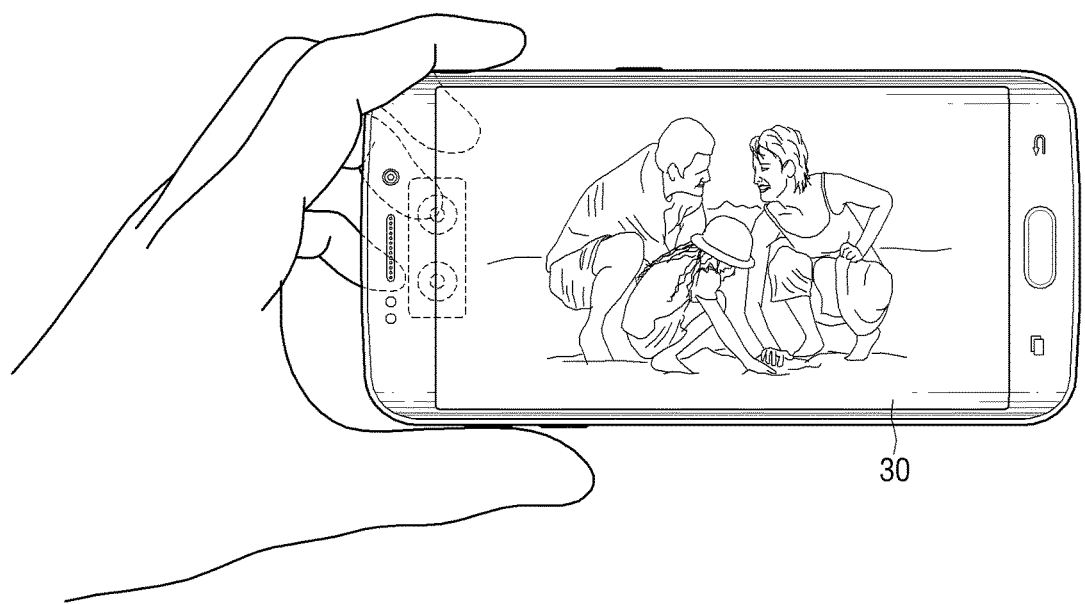

FIG. 1B
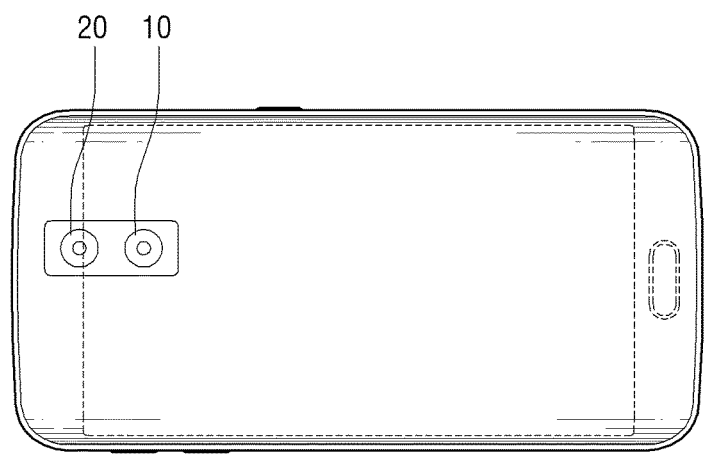
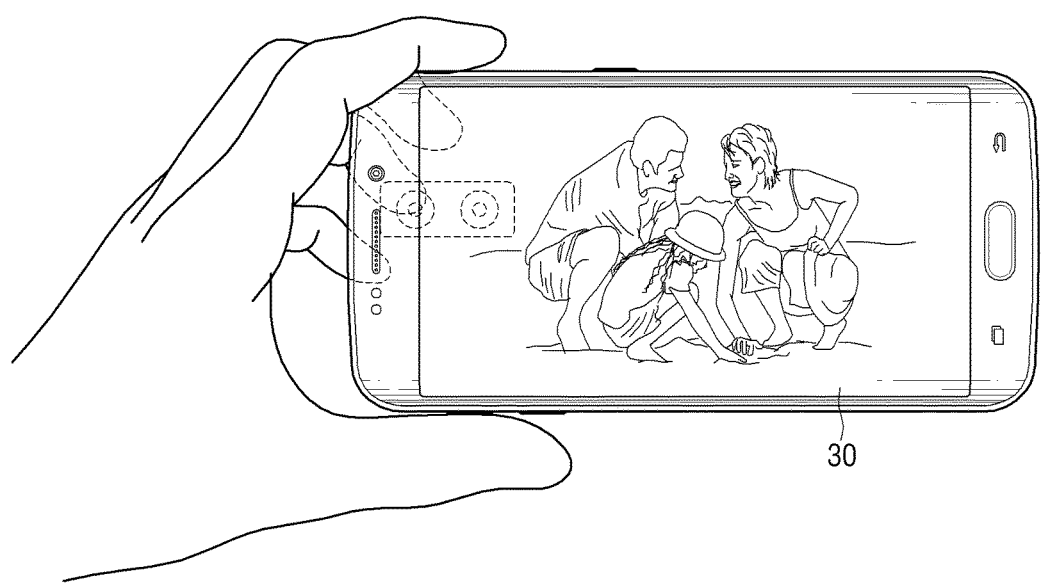

FIG. 7A
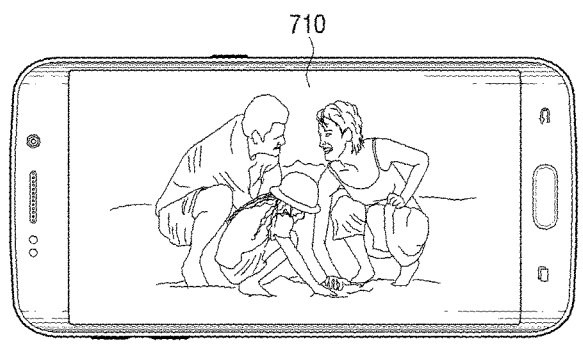
FIG. 7B
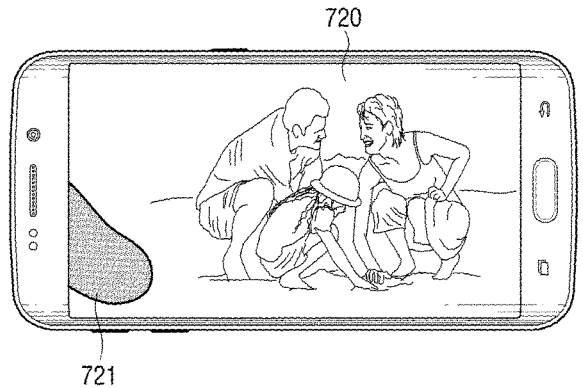

PHOTOGRAPHING APPARATUS AND METHOD FOR CONTROLLING THE SAME

CROSS-REFERENCE TO RELATED APPLICATION

This application is based on and claims priority under 35 U.S.C. §119 to Korean Patent Application No. 10-2015-0115540, filed on Aug. 17, 2015, in the Korean Intellectual Property Office, the disclosure of which is incorporated by reference herein in its entirety.

BACKGROUND

1. Field

The disclosure relates generally to a photographing apparatus and a method for controlling the same, and for example, to a photographing apparatus having a plurality of camera modules and a method for controlling the same.

2. Description of Related Art

A camera mounted on a portable terminal apparatus, such as, a smart phone, a tablet Personal Computer (PC), etc., is one of the most frequently used functions. Accordingly, technologies for enhancing performance of a camera mounted in a portable terminal apparatus have been developing.

However, as a portable terminal apparatus, such as, a smart phone, has a limited size, a size of a camera module mounted on the portable terminal device is being miniaturized to correspond to the size of the portable terminal apparatus.

Meanwhile, in order to satisfy user need for further enhancement of performance of the camera mounted on the portable terminal apparatus, for example, image quality, a camera sensor needs to be increased. However, as the size of the camera module mounted on the portable terminal apparatus has been miniaturized, there is a limit in enhancing the image quality of the camera.

In order to resolve such problems, technologies for mounting a multi-camera on a portable terminal apparatus, such as, a smart phone, have been developing. When the multi-camera is mounted on the portable terminal apparatus, it is possible for the apparatus to provide diverse image services. However, in this case, the multi-camera occupies a broader area than the conventional single camera, and thus, a foreign substance, such as, a user finger, may be easily exposed to a lens of the multi-camera. Accordingly, a user may do not perform a desired image photographing operation.

SUMMARY

The disclosure has been provided to address the aforementioned and other problems and disadvantages occurring in the related art, and an aspect of the disclosure provides a photographing apparatus which notifies a user of a state in which a foreign substance appears on at least one of a plurality of camera modules more intuitionally.

In addition, an aspect of the disclosure provides a photographing apparatus which photographs an image or generates a composite image when a foreign substance does not exist on a plurality of camera modules.

According to an example of the disclosure, a photographing apparatus is provided. The photographing apparatus includes a first buffer configured to store a plurality of images generated by a first camera module among a plurality of camera modules, a second buffer configured to store a plurality of images generated by a second camera module among the plurality of camera modules, a display configured to display an image generated by the first camera module as a live image, and a controller configured to analyze the images stored in the first buffer and the second buffer using at least one of image information of each image stored in the first buffer and the second buffer and photographing information of the plurality of camera modules, and in response to an event occurring in at least one of the plurality of images stored in the second buffer, to control the display to provide a state notification service on the second camera module.

In response to an image in which the event occurred being detected, the controller may be configured to control the display to convert and display the image in which the event occurred as the live image.

The display may include a main display and a curved-surface auxiliary display configured to be extended in a certain direction from the main display. In response to the image in which the event occurred being detected, the controller may be configured to control the display to display the live image on the main display and to display an event User Interface (UI) with respect to the image in which the event occurred on the curved-surface auxiliary display.

The apparatus may further include communication circuitry configured to perform data communication with an adjacent terminal apparatus. In response to the image in which the event occurred being detected, the controller may be configured to control the communication circuitry to transmit event occurrence-related information to the adjacent terminal apparatus.

The image information may include at least one of brightness information, histogram information, and pixel information of an image. The photographing information may include at least one of lens position information for autofocus, phase difference information, and contrast level information on at least one of the plurality of camera modules. In addition, the first buffer and the second buffer may match and store the image information on each image and the photographing information.

The image in which the event occurred may be one of an image generated when at least a part of the second camera module is covered with a foreign substance and an autofocused image different from other images is stored in the first buffer or in the second buffer.

The controller may be configured to generate a composite image from the images stored in the first buffer and the second buffer and to control the display to display the generated composite image. In response to the image in which the event occurred being detected, the controller may be configured to generate a composite image from an image adjacent to the image in which the event occurred among the images stored in the first buffer and the images stored in the second buffer.

The controller may be configured to detect an occlusion region based on parallax of each of the images stored in the first buffer and the second buffer and to determine whether to generate the composite image based on whether a detected amount of the occlusion region is greater than a predetermined value (which may be referred to as a predetermined critical value).

The first camera module may include a wide-angle lens, and the second camera module comprises a telephoto lens. The controller may be configured to determine whether to generate the composite image based on focusing information of each of the first camera module and the second camera module and close-up photographing information corresponding to a command.

According to an example of the disclosure, a method for controlling a photographing apparatus with a plurality of camera modules is provided. The method includes displaying an image generated by a first camera module among the plurality of camera modules as a live image, storing images generated by the first camera module in a first buffer and storing images generated by a second camera module among the plurality of camera modules in a second buffer, analyzing the images stored in the first buffer and the second buffer using at least one of image information of each image stored in the first buffer and the second buffer and photographing information of the plurality of camera modules, and providing, in response to an event occurring in at least one of the plurality of images stored in the second buffer, a state notification service on the second camera module.

In response to an image in which the event occurred being detected, the providing may include converting and displaying the image in which the event occurred as the live image.

In response to the image in which the event occurred being detected, the providing may include displaying the live image in a main display and displaying an event User Interface (UI) with respect to the image in which the event occurred in a curved-surface auxiliary display.

In response to the image in which the event occurred being detected, the providing may include transmitting event occurrence-related information to an adjacent terminal apparatus.

The image information may include at least one of brightness information, histogram information, and pixel information of an image. The photographing information may include at least one of lens position information for autofocus, phase difference information, and contrast level information of at least one of the plurality of camera modules. In addition, the first buffer and the second buffer may match and store the image information of each image and the photographing information.

The image in which the event occurred may be one of an image generated while a part of or an entire part of the second camera module is covered with a foreign substance and an auto-focused image different from other images is stored in the first buffer or in the second buffer.

The method may further include determining whether to generate a composite image from the images stored in the first buffer and the second buffer based on a command and generating a composite image from the images stored in the first buffer and the second buffer based on a determination result and displaying the generated composite image. In response to the image in which the event occurred being detected, the displaying may include generating and displaying a composite image from an image adjacent to the image in which the event occurred among the images stored in the first buffer and the images stored in the second buffer.

The determining may include detecting an occlusion region based on parallax of each of the images stored in the first buffer and the second buffer and determining whether to generate the composite image based on whether a detected amount of the occlusion region is greater than a predetermined value (e.g., a predetermined critical value).

The first camera module may include a wide-angle lens, and the second camera module comprises a telephoto lens. The determining may include determining whether to generate the composite image based on focusing information of each of the first camera module and the second camera module and close-up photographing information corresponding to a command.

According to an example of the disclosure, a photographing apparatus is provided. The apparatus includes a first buffer configured to store a plurality of images generated by a first camera module among a plurality of camera modules, a second buffer configured to store a plurality of images generated by a second camera module among the plurality of camera modules, a display configured to display an image generated by the first camera module as a live image, and a controller configured to generate a composite image from the images stored in the first buffer and the second buffer based on a command and to control the display to display the generated composite image. The controller may be configured to analyze the images stored in the first buffer and the second buffer using at least one of image information of each image stored in the first buffer and the second buffer and photographing information of the plurality of camera modules and in response to an event occurring in at least one of the plurality of images stored in the second buffer, to generate a composite image from images other than an image in which the event occurred and the images stored in the first buffer.

In response to the image in which the event occurred being detected, the controller may be configured to generate a composite image from an image adjacent to the image in which the event occurred among the images stored in the first buffer and the images stored in the second buffer and to control the display to display the generated composite image.

In response to the image in which the event occurred being detected, the controller may be configured to control the display to provide a state notification service on the second camera module.

The image information may include at least one of brightness information, histogram information, and pixel information of an image. The photographing information may include at least one of lens position information for autofocus, phase difference information, and contrast level information of at least one of the plurality of camera modules. In addition, the first buffer and the second buffer may match and store the image information of each image and the photographing information.

According to the above-described various examples of the disclosure, when a foreign substance appears on at least one of a plurality of camera modules, the photographing apparatus may notify a user of the state more intuitionally.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein:

FIG. 1A is a diagram illustrating an example photographing apparatus;

FIG. 1B is a diagram illustrating an example photographing apparatus;

FIG. 7A and FIG. 7B are first demonstration diagrams illustrating an example of providing a state notification service of a plurality of camera modules in a photographing apparatus;

DETAILED DESCRIPTION

Figure 2:
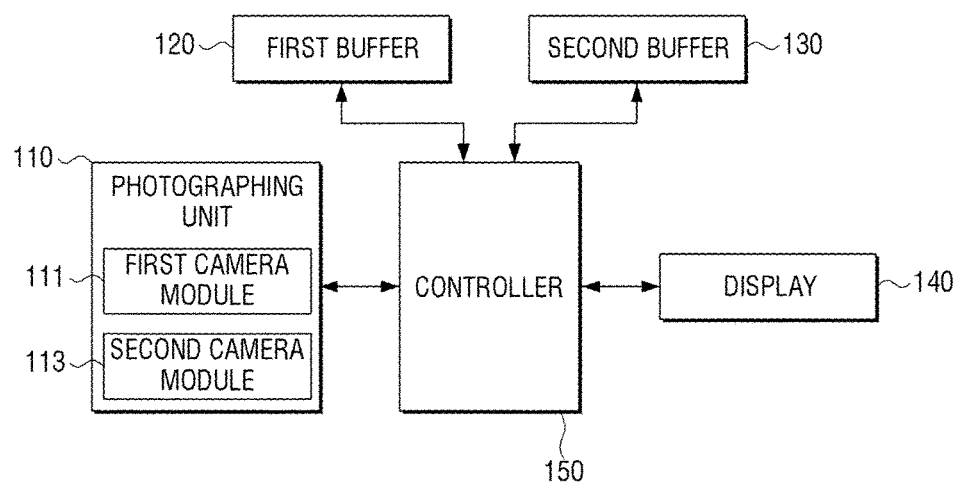
FIG. 2 is a block diagram illustrating an example structure of a photographing apparatus.

An overview of the description of the disclosure and accompanying drawings is provided in advance of describing the various example embodiments of the disclosure in greater detail.

Terms used in the following descriptions and claims are common expressions selected by considering functions in various examples of the disclosure. However, such terms may vary depending upon an intention of a person having ordinary skill in the art, legal/technical interpretation, or advent of new technology. In addition, some of the terms may have been selected arbitrarily. The terms may be interpreted as defined herein, and unless otherwise defined, may be interpreted based on overall descriptions of the disclosure and common technical knowledge in the art.

In the following description, like drawing reference numerals and symbols refer to the like elements which perform the same or similar function substantially, even in different drawings, for convenience in explanation and for better understanding. For example, although a plurality of drawings share elements having the same reference numerals, the plurality of drawings do not necessarily relate to one or the same example.

In the following descriptions and claims, a term including an ordinal, such as, 'first,' 'second,' etc., may be used to distinguish elements. The ordinal is used to distinguish the same or similar elements and does not limit the meaning of the term. For instance, ordinals do not affect an order of use or an order of arrangement of elements expressed with the ordinals. Respective ordinals may be replaced with each other, if necessary.

In the following descriptions, a term in a singular form includes a plural form unless it is intentionally written that way. In addition, in the following descriptions, the terms 'include' and 'have' refer to the disclosed feature, number, step, operation, element, part, or combination thereof and are not intended to exclude any possibilities of existence or addition of one or more other features, numbers, steps, operations, elements, parts or combination thereof.

In the following descriptions, the terms 'module,' 'unit,' and 'part' may refer to an element which performs at least one function or operation. The element may be realized as hardware (e.g., circuitry), software, or combination thereof. In addition, a plurality of 'modules,' 'units,' and 'parts' may be integrated into at least one module or chip such that it is realized as at least one processor (not shown) except for a case where respective 'modules,' 'units,' and 'parts' need to be realized as discrete specific hardware.

When it is described that one part is connected to another part, the connection may include a direct connection between the parts and an indirect connection through other medium. In addition, the description that a certain part includes an element signifies that the part may further include other elements rather than signifying that the part excludes other elements, unless otherwise described.

Certain examples are described in greater detail below with reference to the accompanying drawings.

FIG. 1A is a diagram illustrating an example photographing apparatus, and FIG. 1B is a diagram illustrating an example photographing apparatus.

For example, a photographing apparatus may be realized as a portable terminal apparatus, such as, a smart phone, a tablet PC, etc., and may include a plurality of camera modules 10, 20 for photographing an image (hereinafter referred to as 'first camera module' and 'second camera module'). According to an example, the first and second camera modules 10, 20 may, for example, be arranged in a vertical direction on a rear surface of the photographing apparatus, as illustrated in FIG. 1A. According to another example, the first and second camera modules 10, 20 may, for example, be arranged in a horizontal direction on a rear surface of the photographing apparatus, as illustrated in FIG. 1B.

The first camera module 10 may include, for example, a wide-angle lens for a broad range of image photographing, and the second camera module 20 may include, for example, a telephoto lens for a long range of image photographing. The photographing apparatus may obtain images corresponding to a characteristic of the lens of each of the first and second camera modules 10, 20. For example, the first camera module 10 may, for example, provide a wider image than the second camera module 10 which is focused at the same distance as the first camera module 10. The second camera module 20 may, for example, provide an image which is out of the range of the first camera module 10.

As illustrated in FIG. 1A or FIG. 1B, a front surface of the photographing apparatus may include a display panel 30, and may be configured to determine an image generated by at least one of the first and second camera modules 10, 20 as a live image with respect to a subject to be photographed and display the determined image as the live image.

The display panel 30 may display a live image with respect to the image generated by at least one of the first and second camera modules 10, 20 and receive a command with respect to the displayed live image. In response to the command with respect to the live image, the photographing apparatus may photograph a still image or a moving image from the live image displayed in the display panel 30. In addition, in response to the command with respect to the live image, the photographing apparatus may, for example, generate a composite image by composing the images generated by the first and second camera modules 10, 20 or generate a three-dimensional (3D) image.

As described above, the photographing apparatus may determine the image generated by at least one of the first and second camera modules 10, 20 as a live image and display the image determined as the live image through the display panel 30.

For example, images may be generated through the first camera module 10 and the second camera module 20, and a live image with respect to the image generated by the first camera module 10 among the images generated by the first and second camera modules 10, 20 may be displayed through the display panel 30.

As illustrated in FIG. 1A or FIG. 1B, a user's finger may come into contact with, for example, the second camera module 20 while the live image with respect to the image generated by the first camera module 10 is displayed. In this case, an image relevant to the user's finger may be inserted into a certain region of an image generated by the second camera module 20. The photographing apparatus determines that the an event (e.g., a finger being inserted into a region of an image) occurs by analyzing the image generated by the second camera module 20 and displays the image in which the event occurred in the display panel 30.

Accordingly, the user may recognize that his/her finger came into contact with the second camera module 20 and move the finger to a region in which the first and second camera modules 10, 20 are not arranged.

As described above, the photographing apparatus may analyze images generated by at least one of the first and second camera modules 10, 20, detect an image in which an event occurred, and display the detected image so that a user is able to recognize a current photographing state more intuitionally.

Hereinafter, respective components of the photographing apparatus will be described in greater detail.

Figure 3:
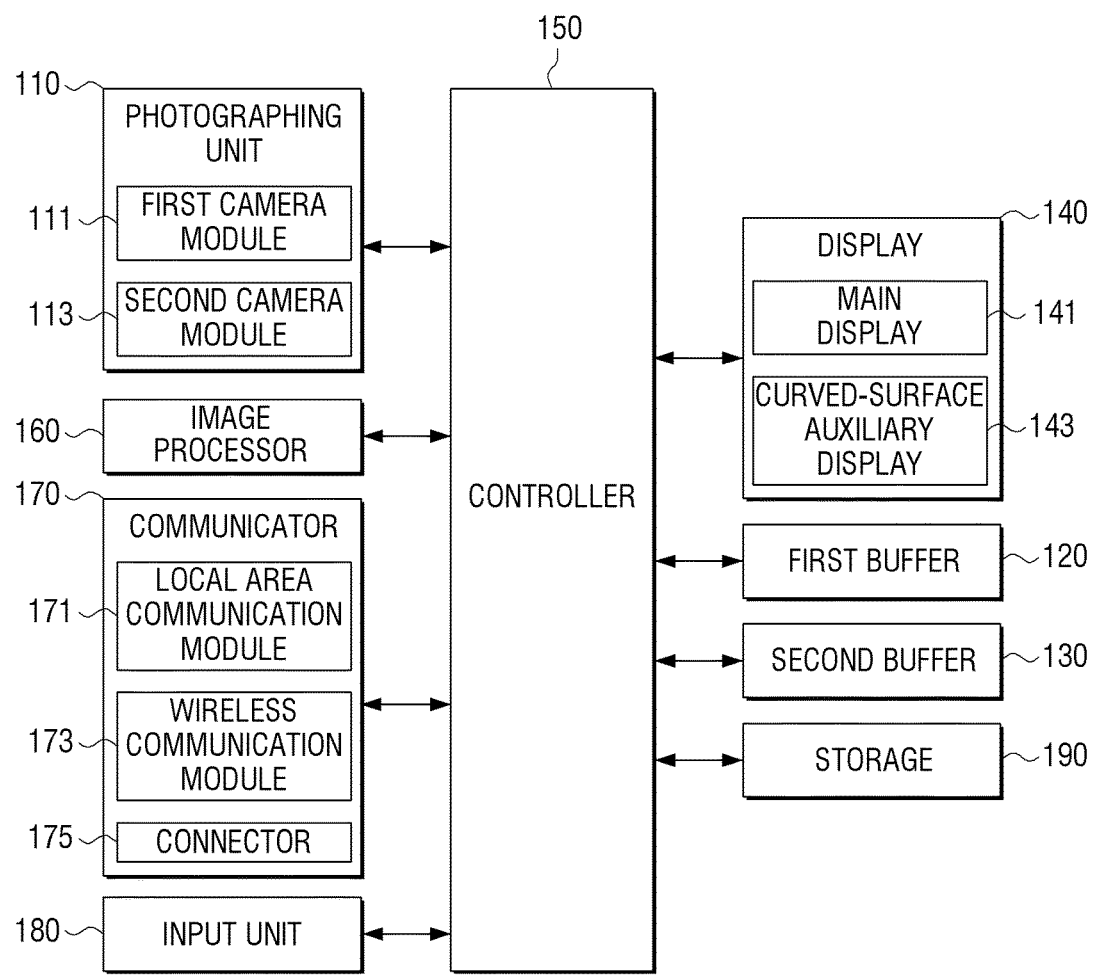
FIG. 3 is a block diagram illustrating an example structure of a photographing apparatus.

FIG. 2 is a block diagram illustrating an example structure of an example photographing apparatus, and FIG. 3 is a more detailed block diagram illustrating an example structure of an example photographing apparatus.

As illustrated in FIG. 2, the photographing apparatus includes a photographing unit 110, a first buffer (e.g., including a memory) 120, a second buffer (e.g., including a memory) 130, a display 140, and a controller 150. As illustrated in FIG. 3, the photographing apparatus may further include an image processor 160, a communicator (e.g., including communication circuitry) 170, an input unit (e.g., including input circuitry) 180, and a storage 190, in addition to the components described above with reference to FIG. 2.

For example, the photographing unit 110 for photographing an image may be applied to a photographing apparatus such as a Compact System Camera (CSC). The photographing unit 110 may include a plurality of camera modules 111, 113 (hereinafter referred to, for example, as 'first camera module' and 'second camera module'). The first camera module 111 may include, for example, a wide-angle lens for a broad range of image photographing, and the second camera module 113 may include, for example, a telephoto lens for a long range of image photographing.

The photographing unit 110 may obtain images corresponding to a characteristic of the lens of each of the first and second camera modules 111, 113. For example, the photographing unit 110 may provide a wider image than the second camera module 113 which is focused at the same distance as the first camera module 111, through the first camera module 111. In addition, the photographing unit 110 may provide an image which is out of range of the first camera module 111, through the second camera module 113.

The first and second camera modules 111, 113 receive external light admitted through the lens (the wide-angle lens and the telephoto lens) included in each camera module and convert the received external light into an electrical signal. For example, in response to the external light being admitted through each lens driven by a control command of the controller 150 and being formed on an imaging surface, the first and second camera modules 111, 113 may convert the external light formed on the imaging surface into an electrical signal using a photoelectric conversion device such as, for example, a Charge Coupled Device (CCD) or Complementary Metal Oxide Semiconductor (CMOS), or the like. A more detailed description on the controller 150 will be provided below. In this case, a position of each lens included in the first and second camera modules 111, 113 may be changed based on a control command of the controller 150 thereby expanding or reducing a size of a subject to be photographed or performing autofocus for adjusting a focus with respect to a subject.

The image processor 160 illustrated, for example, in FIG. 3 processes raw image data with respect to the electrical signal converted by the first and second camera modules 111, 113 of the photographing unit 110 to generate a live image with respect to the subject to be photographed.

The above-described method for converting an external light into an electrical signal by using the photographing unit 110 and the image processor 160 and generating a live image from the converted electrical signal pertains to the common knowledge in the art in connection with a camera having an electric or optical viewfinder, and thus, the detailed description is omitted.

The first buffer 120 may temporarily store a plurality of images generated by the first camera module 111 among the plurality of camera modules. The second buffer 130 may temporarily store a plurality of images generated by the second camera module 113 among the plurality of camera modules. For example, the first and second buffers 120, 130 temporarily store the plurality of images generated by the first and second camera modules 111, 113 in connection with a subject to be photographed, before a command relevant to a photographing operation is received. In this case, it may be desirable that the plurality images being temporarily stored in the first and second buffers 120, 130 are stored sequentially based on a generated order.

In addition, it may be desirable that the first and second buffers 120, 130 match and store at least one of the plurality of images being temporarily stored, image information on each image, and photographing information. In this case, the image information may include, for example, at least one of brightness information, histogram information, and pixel information of an image, and the photographing information may include at least one of lens position information for autofocus, phase difference information, and contrast level information of each camera module in connection with generating an image.

The first and second buffers 120, 130 may, for example, match and store at least one of the plurality of images being temporarily stored, the image information of each image, and the photographing information.

The display 140 may display the image generated by the first camera module 111 among the plurality of camera modules as a live image. In the example, it is described that the images generated by the first camera module 111 are displayed as a live view, but is not limited thereto. For example, the image generated by the second camera module 113 among the plurality of camera modules may be also displayed as a live image. In addition, each of the image generated by the first and second camera modules 111, 113 may be displayed as a live image.

The display 140 may display a photographed still image, a photographed moving image, and a command-related UI for controlling an operation of the photographing apparatus, on top of or overlapping a live image with respect to a subject to be photographed. The display 140 may, for example, be realized as a Liquid Crystal Display (LCD), Organic Light-Emitting Diode (OLED), Plasma Display Panel (PDP), etc. Further, the display 140 may, for example, be realized as a touch panel for receiving a touch command in connection with a displayed UI.

The controller 150 may be configured to analyze the images stored in the first buffer and second buffers 120, 130 using, for example, at least one of the image information of each image stored in the first and second buffers 120, 130 and the photographing information of the first and second camera modules 111, 113. In response to analyzing that an event occurs in at least one of the plurality of images stored in the second buffer 130, the controller 150 may be configured to control the display 140 to provide a state notification service on the second camera module 113.

An image in which an event occurred may, for example, be an image generated by the second camera module 113 while a part of or an entire part of the second camera module 1113 is covered with a foreign substance, such as, for example, a user's finger, or, for example, an auto-focused image different from other images stored in the second buffer 130.

For example, in response to an image in which an event occurred being detected, the controller 150 may be configured to control the display 140 to convert and display a live image with respect to the image generated by the first camera module 111 to the image in which the event occurred.

For example, in response to an image in which the event occurred being detected, the controller 150 may be configured to control the display 140 to display a live image with respect to the image generated by the first camera module 111 in a first region of the display 140 and display an event UI with respect to the image in which the event occurred in a second region on the display 140.

For example, as illustrated in FIG. 3, the display 140 may include a main display 141 and a curved-surface auxiliary display 143 which is extended in a certain direction from the main display 141.

For example, in response to the image in which the event occurred being detected, the controller 150 may be configured to control the display 140 to display the live image with respect to the image generated by the first camera module 111 in the main display 141. In addition, the controller 150 may be configured to control the display 140 to display an event UI with respect to the image in which the event occurred, for example, the event UI with respect to the images generated by the second camera module 113, in the curved-surface auxiliary display 143. Based on the control command, the display 140 may display the live image in the main display 141 and display the event UI with respect to the image in which the event occurred in the curved-surface auxiliary display 143.

For example, in response to the image in which the event occurred being detected, the controller 150 may be configured to control the communicator (e.g., including communication circuitry) 170 to transmit event occurrence-related information to an adjacent terminal apparatus (not shown). The communicator 170 may transmit the event occurrence-related information to the adjacent terminal apparatus (not shown), and the adjacent terminal apparatus (not shown) may provide a state notification service of the second camera module 113 based on the event occurrence-related information received from the photographing apparatus. According to an example, the adjacent terminal apparatus (not shown) may provide a notification that a photographing operation of the second camera module 113 may be performed abnormally through a notification service, such as, for example, a vibration feedback, a message alarm feedback, a beep sound feedback, a lamp alarm feedback, etc., based on the event occurrence-related information received from the photographing apparatus.

Meanwhile, the communicator 170 which transmits the event occurrence-related information to the adjacent terminal apparatus (not shown) may include, for example, a local area communication module 171, a wireless communication module 173, such as, a wireless Local Area Network (LAN) module, and a connector 175 including at least one of wired communications modules such as a High Definition Multimedia Interface (HDMI), a Universal Serial Bus (USB), Institute of Electrical and Electronics Engineers (IEEE) 1394, etc.

The local area communication module 171 may perform local area communication between the photographing apparatus and the adjacent terminal apparatus (not shown) in a wireless manner. The local area communication module 171 may include, for example, at least one of a Bluetooth module, an Infrared Data Association (IrDA) module, a Near Field Communication (NFC) module, a Wireless-Fidelity (Wi-Fi) module, and a Zigbee module, or the like.

The wireless communication module 173 may be connected to an external network according to a wireless communication protocol, such as, for example, IEEE, to perform communication. The wireless communication module 173 may further include a mobile communication module which performs communication by accessing a mobile communication network according to diverse mobile communication standards such as 3rd Generation (3G), 3rd Generation Partnership Project (3GPP), Long Term Evolution (LTE), etc.

As described above, the communicator 170 may, for example, be realized by various local area communication methods, and other communication methods and/or communication circuitry which are not mentioned in the disclosure may be employed based on need.

The connector 175 may provide an interface with respect to various source apparatuses, such as, USB 2.0, USB 3.0, HDMI, IEEE 1394, etc. The connector 175 may receive content data transmitted from an external server (not shown) or transmit pre-stored content data to an external recording medium through a wired cable connected to the connector 175, based on a control command of the controller 150. In addition, the connector 175 may be supplied with power through a wired cable which is physically connected to the connector 175.

The input unit 180 may include, for example, input circuitry that serves as an input means for receiving various commands and transmitting the commands to the controller 150. The input unit 180 may include, for example, a manipulation unit (not shown) and a touch input unit (not shown) for receiving a user manipulation command and a second input unit (not shown) for receiving a control signal corresponding to a command from a remote control apparatus (not shown).

The manipulation unit (not shown) may, for example, be realized as a keypad having various function keys, number keys, special keys, letter keys, etc. The touch input unit (not shown) may, for example, be realized as a touch pad forming a mutual layer structure with the display 140 in response to the display 140 being realized as a touch screen.

The second input unit (not shown) may, for example, receive a command, such as, a channel tuning command, a function setting command with respect to the photographing apparatus, etc., through a control command including an Infrared Rays (IR) signal, a Radio Frequency (RF) signal, and the like from the remote control apparatus (not shown) or a voice signal with respect to a user's uttered voice.

The storage 190 may, for example, store diverse images and an Operating System (OS) for controlling the operations of the photographing apparatus. For example, the OS may be a program which is read from the storage 190 and compiled to operate each component of a portable terminal apparatus 100 in response to the photographing apparatus being turned on. The storage 190 may, for example, be realized as at least one of Read-Only Memory (ROM), Random Access Memory (RAM), a memory card which is detachable or mountable with respect to a portable terminal apparatus 100 (for example, a Secure Digital (SD) card, a memory stick, etc.), a non-volatile memory, a volatile memory, a Hard Disk Drive (HDD), and a Solid State Disk (SDD), or the like.

In response to a composite photographing command being received through the input unit 180, the controller 150 may be configured to generate a composite image from an image at a point of time when the composite photographing command is received among the images stored in the first and second buffers 120, 130 and to control the display 140 to display the generated composite image. According to an example, the controller 150 may be configured to generate depth information from a value of each pixel constituting the images stored in the first and second buffers 120, 130 and to compose each image based on the depth information. However, this method is only an example, and a composite image may be generated from the images which are temporarily stored in the first and second buffers 120, 130 by various well-known composite algorithms. In response to a composite image being generated according to the example, the display 140 may display the composite image obtained from the images stored in the first and second buffers 120, 130.

In response to an image in which the event occurred being detected, the controller 150 may be configured to generate a composite image from an image adjacent to the image in which the event occurred from among the images stored in the first buffer 120 and the images stored in the second buffer 130. For example, an image in which an event occurred at a point of time when the composite photographing command is received may be detected. In this case, the controller 150 may be configured to extract the image adjacent to the image in which the event occurred from the second buffer 130. The image adjacent to the image in which the event occurred may be an image stored in the second buffer 130 immediately before the image in which the event occurred is temporarily stored in the second buffer 130. In response to the adjacent image being extracted, the controller 150 may be configured to generate a composite image from the image stored at the point of time when the composite photographing command is received among the images stored in the first buffer 120 and the image extracted from the second buffer 130. The display 140 may display the composite image obtained from the images stored in the first and second buffers 120, 130.

Before generating the composite image from the images stored in the first and second buffers 120, 130, the controller 150 may be configured to determine whether it is possible to generate a composite image from the images stored in the first and second buffers 120, 130, according to the example discussed below.

According to an example, in response to a composite photographing command being received, the controller 150 may be configured to determine whether to generate a composite image based on an occlusion region based on parallax of each image stored in the first and second buffers 120, 130 and a predetermined value (e.g., a predetermine critical value). For example, in response to a composite photographing command being received, the controller 150 may be configured to detect an occlusion region based on the parallax of each image stored in the first and second buffers 120, 130. The controller 150 may be configured to determine whether a detected amount of the detected occlusion region is greater than the predetermined value, for example, a predetermined critical value. In response to determining that the detected amount of the detected occlusion region is greater than the predetermined critical value, the controller 150 may be configured to select one of the images stored in the first and second buffers 120, 130 and to control the display 140 to display the selected image. The display 140 may display the image selected from among the images stored in the first and second buffers 120, 130.

According to another example, the controller 150 may be configured to determine whether to generate a composite image based on focusing information of each of the first and second camera modules 111, 113 and close-up photographing information corresponding to a command. For example, the first camera module 111 may include a wide-angle lens, and the second camera module 113 may include a telephoto lens.

For example, a photographable focusing distance may be applied differently to the first camera module 111 and the second camera module 113 based on the characteristic of the lens of each module.

Figure 4:
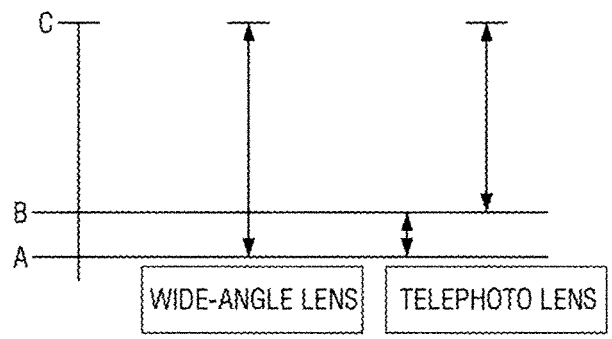
FIG. 4 is a diagram illustrating an example photographable focusing region of a plurality of camera modules of a photographing apparatus.

FIG. 4 is a demonstration diagram illustrating an example photographable focusing region of a plurality of camera modules of a photographing apparatus.

As illustrated in FIG. 4, the first camera module 111 having a wide-angle lens may focus on a subject, ranging from a first point (A) at a close distance to a third point (C) at a long distance. The second camera module 113 having a telephoto lens may focus on a subject, ranging from a second point (B) farther than the first point (A) at the close distance to the third point (C) at the long distance.

For example, the second camera module 113 having the telephoto lens may focus on a subject located at a relatively long distance as compared with the first camera module 111 having a wide-angle lens but is unable to focus on a subject located at a close distance. In response to a composite photographing command being received while close-up photographing information on a subject between the first point (A) which is out of range of the second camera module 113 and the second point (B) is received, the controller 150 may be configured to determine that compositeness of the images generated by the second camera module 113 is unavailable based on the received close-up photographing information and the focusing information on the first and second camera modules 111, 113.

In response to determining that the compositeness of the images generated by the second camera module 113 is unavailable, the controller 150 may be configured to select an image stored in the first buffer 120 among the images stored in the first and second buffers 120, 130 and to control the display 140 to display the selected image. The display 140 may display the image selected from the images stored in the first buffer 120.

An operation of detecting an image in which an event occurred in the photographing apparatus according to an example will be described in greater detail below.

Figure 5A:
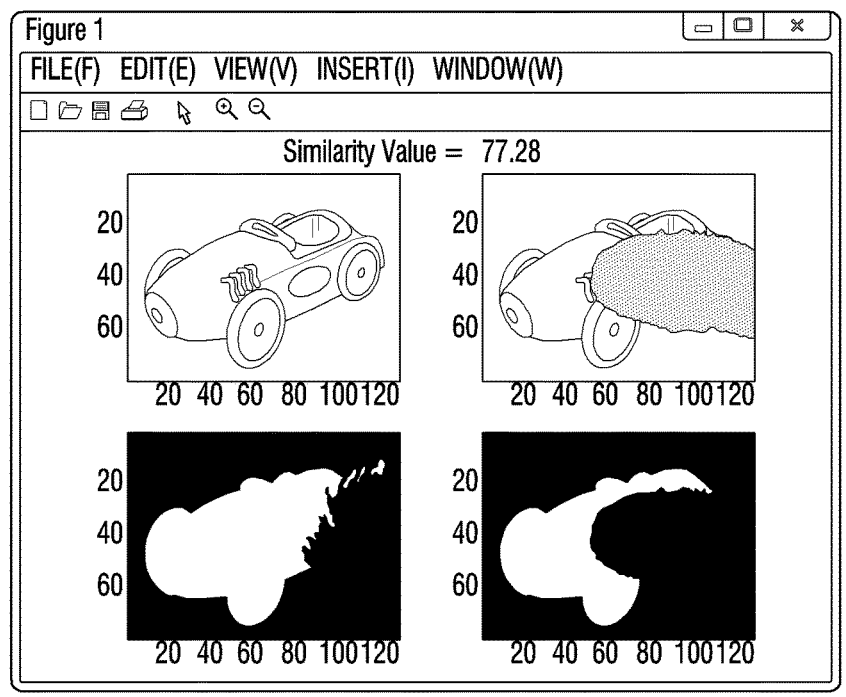
FIG. 5A and FIG. 5B are demonstration diagrams illustrating an example of detecting an image in which an event occurred in a photographing apparatus.
Figure 5B:
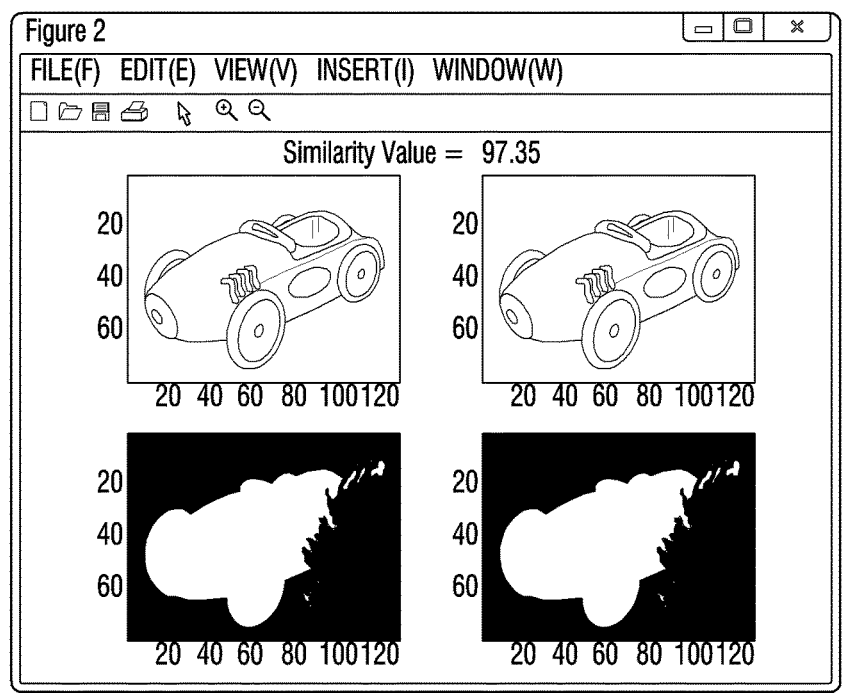

FIGS. 5A and 5B are demonstration diagrams illustrating an example of detecting an image in which an event occurred in a photographing apparatus.

As illustrated in FIG. 5A and FIG. 5B, the controller 150 may be configured to analyze a plurality of images stored in the first and second buffers 120, 130 and to detect an image in which an event occurred. For example, as illustrated in FIG. 5A, the controller 150 may be configured to measure similarity in the images stored in the first buffer 120. In addition, as illustrated in FIG. 5B, the controller 150 may be configured to measure similarity in the images stored in the second buffer 130.

The similarity in the images stored in the first and second buffers 120, 130 may be measured from at least one of brightness information, histogram information, and pixel information of an image. As illustrated, in response to a similarity value measured from the image stored in the first buffer 120 being lower than a similarity value measured from the image stored in the second buffer 130, the controller 150 may be configured to determine that an event occurs in the image stored in the first buffer 120. In this case, the images stored in the first buffer 120 may be images generated by the first camera module 111. In response to determining that an event occurred in the image stored in the first buffer 120, the controller may be configured to provide a state notification service on the first camera module 111 among the first and second camera modules 111, 113, according to the above-described various examples.

A user is able to recognize that his/her finger covers the first camera module 111 intuitionally through the notification service and to move the finger covering the first camera module 111. The first and second camera modules 111, 113 may generate images with respect to a subject to be photographed normally.

Figure 6:
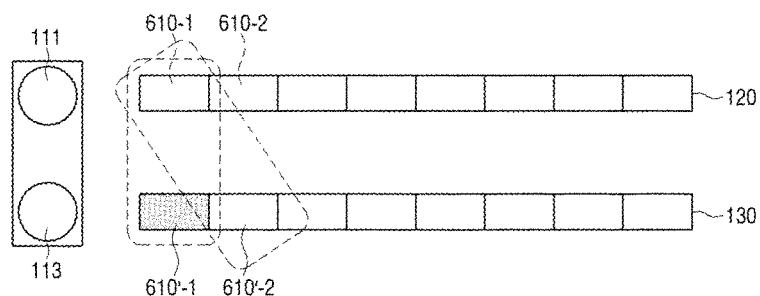
FIG. 6 is a diagram illustrating an example of generating a composite image in a photographing apparatus.

FIG. 6 is a diagram illustrating an example of generating a composite image in a photographing apparatus.

FIG. 6 illustrates an example in which a plurality of images generated by the first camera module 111 are stored temporarily in the first buffer 120 based on a time sequence.

The first and second camera modules 111, 113 may generate images at the same timing, and the generated images may be stored in the first and second buffers 120, 130 temporarily in a sequential order. For example, eight images may be stored in the first and second buffers 120, 130, respectively, and a composite photographing command may be input at a point of time when the eighth image is stored. In this case, the controller 150 may be configured to compose eighth images 610-1, 610'-1 stored in the first and second buffers 120, 130 at the point of time the composite photographing command is input. Before composing the eighth images stored in the first and second buffers 120, 130, the controller 150 may be configured to determine whether an event has occurred based on at least one of the image information on the plurality of images respectively stored in the first and second buffers 120, 130 and the photographing information.

According to an example, the controller 150 may be configured to determine whether an event occurs using at least one of the brightness information, histogram information, and pixel information of the images stored in the first and second buffers 120, 130.

When determining occurrence of an event based on the brightness information, the controller 150 may be configured to determine the similarity between two images based on the brightness information of the eighth images 610-1, 610'-1 respectively being stored in the first and second buffers 120, 130 at the point of time when the composite photographing command is received and the brightness information of preceding images (seventh images 610-2, 610'-2). For example, the controller 150 may be configured to determine a difference value in brightness between two images based on the brightness information of the two images and to determine the similarity of the two images based on the determined difference value and a predetermined critical value. In response to determining that the determined difference value is greater than the predetermined critical value, the controller 150 may be configured to determine that the two images are similar to each other. In response to determining that the determined difference value is less than the predetermined critical value, the controller 150 may be configured to determine that the two images are different from each other.

According to the example, in response to determining that the two images are different, the controller 150 may be configured to detect the eighth image of a buffer of which two images are determined as being different, out of the first and second buffers 120, 130, as an image in which the event occurred.

According to another example, the controller 150 may be configured to determine whether an event occurs based on the photographing information including at least one of the lens position information for autofocus, phase difference information, and contrast level information on the first and second camera modules 111, 113.

When determining the occurrence of an event based on the lens position information, the controller 150 may be configured to compare the lens position information of the eighth images 610-1, 610'-1 respectively being stored in the first and second buffers 120, 130 and the preceding images 610-2, 610'-2 to determine a similarity between the two images. For example, the controller 150 may be configured to determine a distance difference between the lenses based on the lens position information on the two images. In response to the determined distance difference being less than a predetermined critical value, the controller 150 may be configured to determine that the two images are similar to each other. In response to the determined distance difference being greater than the predetermined critical value, the controller 150 may be configured to determine that the two images are different from each other.

According to the example, in response to determining that the two images are different, the controller 150 may be configured to detect the eighth image of a buffer of which two images are determined as being different, out of the first and second buffers 120, 130, as an image in which the event occurred.

According to the above-described various examples, the controller 150 may be configured to detect an image in which the event occurred. In addition, as illustrated, the eighth image 610'-1 of the second buffer 130 may be detected as an image in which the event occurred. As such, in response to the image in which the event occurred being detected, the controller 150 may be configured to extract an image (the seventh image 610'-2) adjacent to the eighth image 610'-1 detected as the image in which the event occurred. The controller 150 may be configured to generate a composite image by composing the eighth image 610-1 stored in the first buffer 120 and the seventh image 610'-2 stored in the second buffer 130.

Hereinafter, an operation of providing a state notification service on the plurality of camera modules 111, 113 in the photographing apparatus will be described in greater detail below.

FIGS. 7A and 7B are diagrams illustrating an example of providing a state notification service on a plurality of camera modules in a photographing apparatus.

As illustrated in FIG. 7A, the photographing apparatus may determine and display an image 710 generated by the predetermined first camera module among the first and second camera modules 111, 113 as a live image.

In this case, before receiving a photographing command, the photographing apparatus may temporarily store a plurality of images generated by the first camera module 111 in the first buffer 120 and temporarily store a plurality of images generated by the second camera module 113 in the second buffer 130.

As described above, while the plurality of images generated by the first and second camera modules 111, 113 are temporarily stored in the first and second buffers 120, 130, the photographing apparatus analyzes the plurality of images stored in the first and second buffers 120, 130 using, for example, at least one of the image information on each of the plurality of images stored in the first and second buffers 120, 130 and the photographing information.

In response to analyzing that at least one of the images stored in the second buffer 130 is an image in which an event occurred, as illustrated in FIG. 7B, the photographing apparatus may determine and display the image in which the event occurred 720 as a live image. For example, the photographing apparatus may display a live image with respect to the image 720 including a foreign substance 721. Accordingly, a user is able to recognize that his/her finger covers a part of the lens of the second camera module 113 based on the displayed live image, move the finger to another place, and then perform a photographing operation.

Accordingly, in response to a photographing command being received, the photographing apparatus may photograph images or compose photographed images while no foreign substance exists on the first and second camera modules 111, 113.

Figure 8:
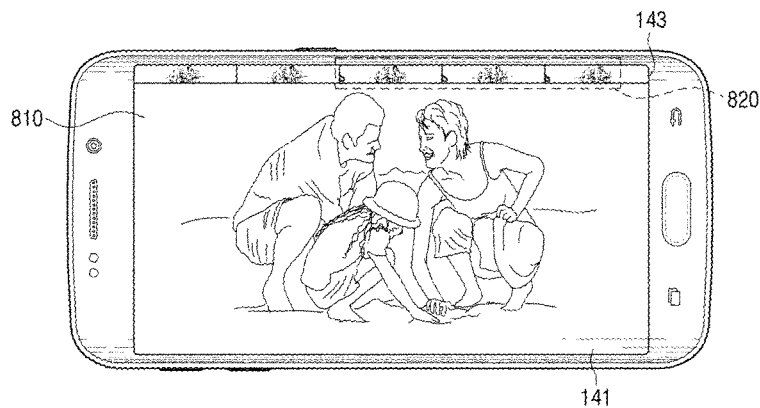
FIG. 8 is a second demonstration diagram illustrating an example of providing a state notification service of a plurality of camera modules in a photographing apparatus.

FIG. 8 is a diagram illustrating an example of providing a state notification service on a plurality of camera modules in a photographing.

As described above in connection with FIG. 7A, the photographing apparatus may display an image 710 generated by the predetermined first camera module 111 among the first and second camera modules 111, 113 as a live image.

In this case, before receiving a photographing command, the photographing apparatus may temporarily store a plurality of images generated by the first camera module 111 in the first buffer 120 and temporarily store a plurality of images generated by the second camera module 113 in the second buffer 130.

As described above, while the plurality of images generated by the first and second camera modules 111, 113 are temporarily stored in the first and second buffers 120, 130, the photographing apparatus analyzes the plurality of images stored in the first and second buffers 120, 130 using, for example, at least one of the image information on each of the plurality of images stored in the first and second buffers 120, 130 and the photographing information.

In response to analyzing that at least one of the images stored in the second buffer 130 is an image in which an event occurred, as illustrated in FIG. 8, the photographing apparatus may display a live image 810 in the main display 141 and may display an event UI 820 with respect to the plurality of images stored in the second buffer 130, the plurality of images including the image in which the event occurred, in the curved-surface auxiliary display 143. In this case, the event UI displayed in the curved-surface auxiliary display 143 may be a thumbnail image corresponding to each of the plurality of images stored in the second buffer 130. The photographing image displays the live image 810 in the main display 141 and display thumbnail images corresponding to the plurality of images stored in the second buffer 130 including the image in which the event occurred in the curved-surface auxiliary display 143. Accordingly, a user is able to recognize that his/her finger covers a part of the lens of the second camera module 113 based on the thumbnail images displayed in the curved-surface auxiliary display 143, move the finger to another place, and then perform a photographing operation.

In addition, the photographing apparatus may, for example, apply a highlight effect to a thumbnail image corresponding to an image in which the event occurred among the thumbnail images corresponding to the plurality of images displayed in the curved-surface auxiliary display 143, but is not limited thereto. For example, the photographing apparatus may apply various event effects that a user is able to recognize to a thumbnail image corresponding to an image in which the event occurred among the thumbnail images corresponding to the plurality of images displayed in the curved-surface auxiliary display 143.

As described above, as the photographing apparatus may apply a highlight effect to the thumbnail image corresponding to the image in which the event occurred, the user is able to recognize that his/her finger covers a part of the lens of the second camera module 113 more intuitionally through the highlighted thumbnail image.

Figure 9:
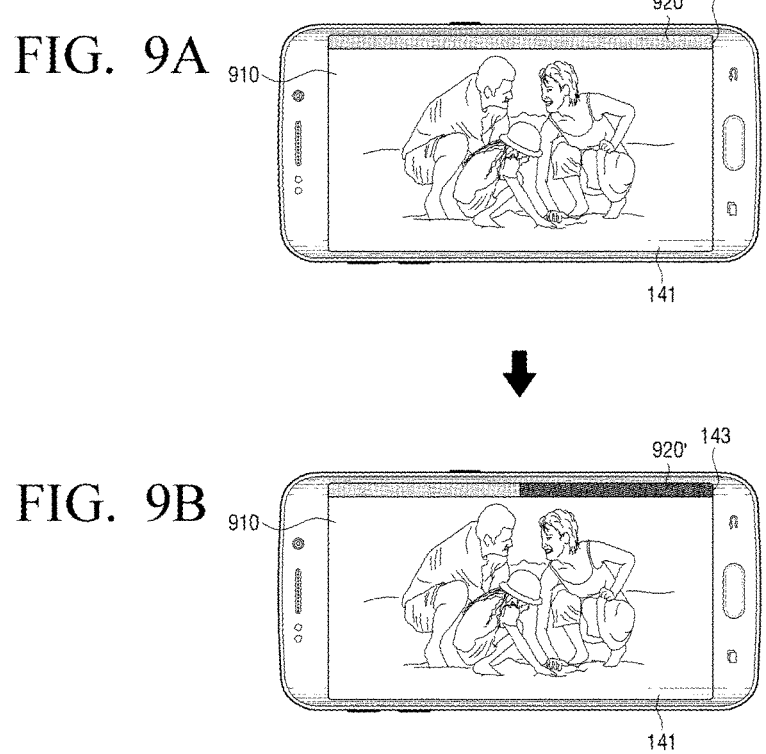
FIG. 9A and FIG. 9B are third demonstration diagrams illustrating an example of providing a state notification service on a plurality of camera modules in a photographing apparatus.

FIG. 9A and FIG. 9B are diagrams illustrating an example of providing a state notification service on a plurality of camera modules in a photographing.

As illustrated in FIG. 9A, the photographing apparatus may determine an image 910 generated by the predetermined first camera module 111 among the first and second camera modules 111, 113 as a live image and display the image determined as the live image through the main display 141. In addition, the photographing apparatus may display an event UI 920 with respect to histogram information of an image generated by the second camera module 113 at a point of time when the image determined as the live image was generated through the curved-surface auxiliary display 143.

According to an example, in response to determining that an event does not occur based on an analysis of the image generated by the second camera module 113, the photographing apparatus may display the event UI 920 with respect to the histogram information in, for example, a strip form including a first color through the curved-surface auxiliary display 143.

Before receiving a photographing command, the photographing apparatus may temporarily store a plurality of images generated by the first camera module 111 in the first buffer 120 and temporarily store a plurality of images generated by the second camera module 113 in the second buffer 130.

As described above, while the plurality of images generated by the first and second camera modules 111, 113 are temporarily stored in the first and second buffers 120, 130, the photographing apparatus analyzes the plurality of images stored in the first and second buffers 120, 130 using, for example, at least one of the image information on each of the plurality of images stored in the first and second buffers 120, 130 and the photographing information.

In response to at least one of the images stored in the second buffer 130 being detected as an image in which the event occurred, as illustrated in FIG. 9B, the photographing apparatus may display an event UI 920 of which color has been changed to a second color different from the first color through the curved-surface auxiliary display 143. In this case, the photographing apparatus may provide the event UI 920' which displays an entire part of a display region of the curved-surface auxiliary display 143 in the second color different from the first color or provide the event UI 920' which displays a part of the display region of the curved-surface auxiliary display 143 in the second color. In response to a part of the display region of the curved-surface auxiliary display 143 being displayed in the second color, the photographing apparatus may determine a region in which the second color is displayed based on an order of storing the image in which the event occurred.

For example, in response to an image which has been stored most recently among the images temporarily being stored in the second buffer 130 being detected as an image in which the event occurred, the photographing apparatus may display a right region of the curved-surface auxiliary display 143 in the second color.

A user is able to recognize, for example, that his/her finger covers a part of the lens of the second camera module 113 based on the color of an auxiliary region 20 displayed in the curved-surface auxiliary display 143, move the finger to another place, and then perform a photographing operation. In response to a photographing command being received, the photographing apparatus may photograph images or compose photographed images while no foreign substance exists on the first and second camera modules 111, 113.

Figure 10:
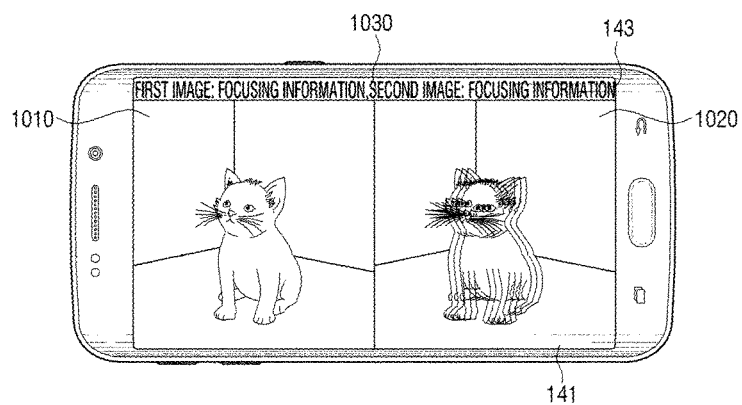
FIG. 10 is a fourth demonstration diagram illustrating an example of providing a state notification service on a plurality of camera modules in a photographing apparatus.

FIG. 10 is a diagram illustrating an example of providing a state notification service on a plurality of camera modules in a photographing apparatus.

As illustrated in FIG. 7A, the photographing apparatus may determine and display the image 710 generated by the predetermined first camera module 111 among the first and second camera modules 111, 113 as a live image.

In this case, before receiving a photographing command, the photographing apparatus may temporarily store a plurality of images generated by the first camera module 111 in the first buffer 120 and temporarily store a plurality of images generated by the second camera module 113 in the second buffer 130.

As described above, while the plurality of images generated by the first and second camera modules 111, 113 are temporarily stored in the first and second buffers 120, 130, the photographing apparatus analyzes the plurality of images stored in the first and second buffers 120, 130 using, for example, at least one of the image information on each of the plurality of images stored in the first and second buffers 120, 130 and the photographing information.

In response to analyzing that at least one of the images stored in the second buffer 130 is an image in which an event occurred, as illustrated in FIG. 10, the photo graphing apparatus displays the live image in a first region 1010 of the main display 141 and display the image in which the event occurred in a second region 1020. In addition, the photographing apparatus may display an event UI 1030 including at least one of photographing information on the live image displayed in the first region 1010 and photographing information on the image in which the event occurred displayed in the second region 1020, through the curved-surface auxiliary display 143.

However, this example is not limited thereto. For example, in response to at least one of the images stored in the second buffer 130 being detected as an image in which the event occurred, the photographing apparatus may display a live image in one region of a screen and display the image in which the event occurred in other region of the screen. In addition, in response to at least one of the images stored in the second buffer 130 being detected as an image in which the event occurred, the photographing apparatus may display the photographing information on the image in which the event occurred in a certain part of a region where a live image is displayed.

In addition, as illustrated in connection with FIGS. 8, 9A and 9B, in response to the image in which the event occurred being detected, the photographing apparatus may display a live image in the main display 141 and may display a thumbnail image or histogram information on the image in which the event occurred in the curved-surface auxiliary display 143. In this case, the photographing apparatus may display at least one of the image information and the photographing information on the image in which the event occurred in a certain region of the main display 141 while displaying the thumbnail image or histogram information on the image in which the event occurred in the curved-surface auxiliary display 143.

According to the above-described various examples, a user is able to perform the autofocus with respect to the second camera module 113 again based on the photographing information and then carry out a photographing operation.

Figure 11:
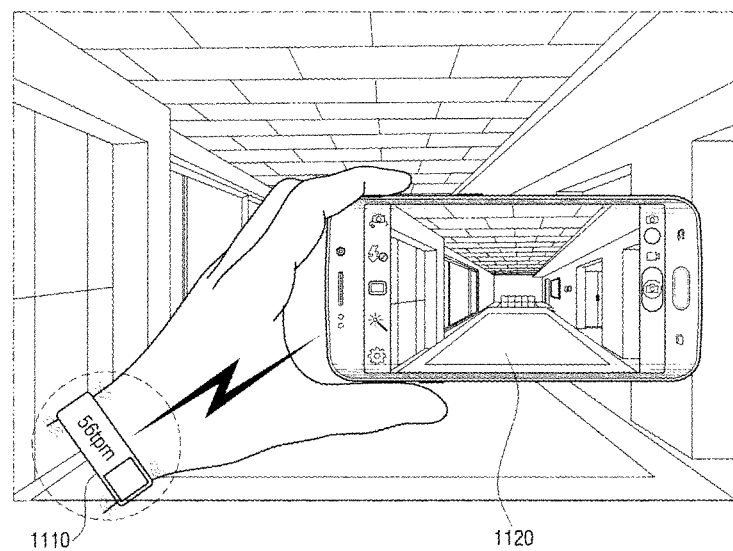
FIG. 11 is a fifth demonstration diagram illustrating an example of providing a state notification service on a plurality of camera modules in a photographing apparatus.

FIG. 11 is a diagram illustrating an example of providing a state notification service on a plurality of camera modules in a photographing apparatus.

As illustrated in FIG. 7A, the photographing apparatus may determine and display an image 1120 generated by the predetermined first camera module 111 among the first and second camera modules 111, 113 as a live image.

In this case, before receiving a photographing command, the photographing apparatus may temporarily store a plurality of images generated by the first camera module 111 in the first buffer 120 and temporarily store a plurality of images generated by the second camera module 113 in the second buffer 130.

As described above, while the plurality of images generated by the first and second camera modules 111, 113 are temporarily stored in the first and second buffers 120, 130, the photographing apparatus analyzes the plurality of images stored in the first and second buffers 120, 130 using, for example, at least one of the image information on each of the plurality of images stored in the first and second buffers 120, 130 and the photographing information.

In response to analyzing that at least one of the images stored in the second buffer 130 is an image in which an event occurred, the photographing apparatus may transmit event occurrence-related information to an adjacent terminal apparatus which is capable of performing data communication with the photographing apparatus. As illustrated, the adjacent terminal apparatus which is capable of performing data communication with the photographing apparatus may, for example, be a smart watch 1110 worn on a user's wrist.

In response to at least one of the images stored in the second buffer 130 being detected as the image in which the event occurred, the photographing apparatus may transmit the event occurrence-related information to the smart watch 1110. Accordingly, the smart watch 1110 may provide a state notification service on the second camera module 113 based on the event occurrence-related information received from the photographing apparatus. According to an example, the smart watch 1110 may inform that a photographing operation of the second camera module 113 may be performed abnormally through a notification service such as a vibration feedback, a message alarm feedback, a beep sound feedback, a lamp alarm feedback, etc., based on the event occurrence-related information received from the photographing apparatus.

Accordingly, a user is able to recognize that his/her finger covers a part of the lens of the second camera module 113 through the notification service provided through the smart watch 1110 being worn on his/her wrist, move the finger to another place, and then perform a photographing operation. In response to a photographing command being received from the user, the photographing apparatus may photograph images or compose photographed images while no foreign substance exists on the first and second camera modules 111, 113.

The operations of the photographing apparatus of the disclosure have been described above. Hereinafter, a description of an example method for controlling a photographing apparatus according to an example will be provided.

Figure 12:
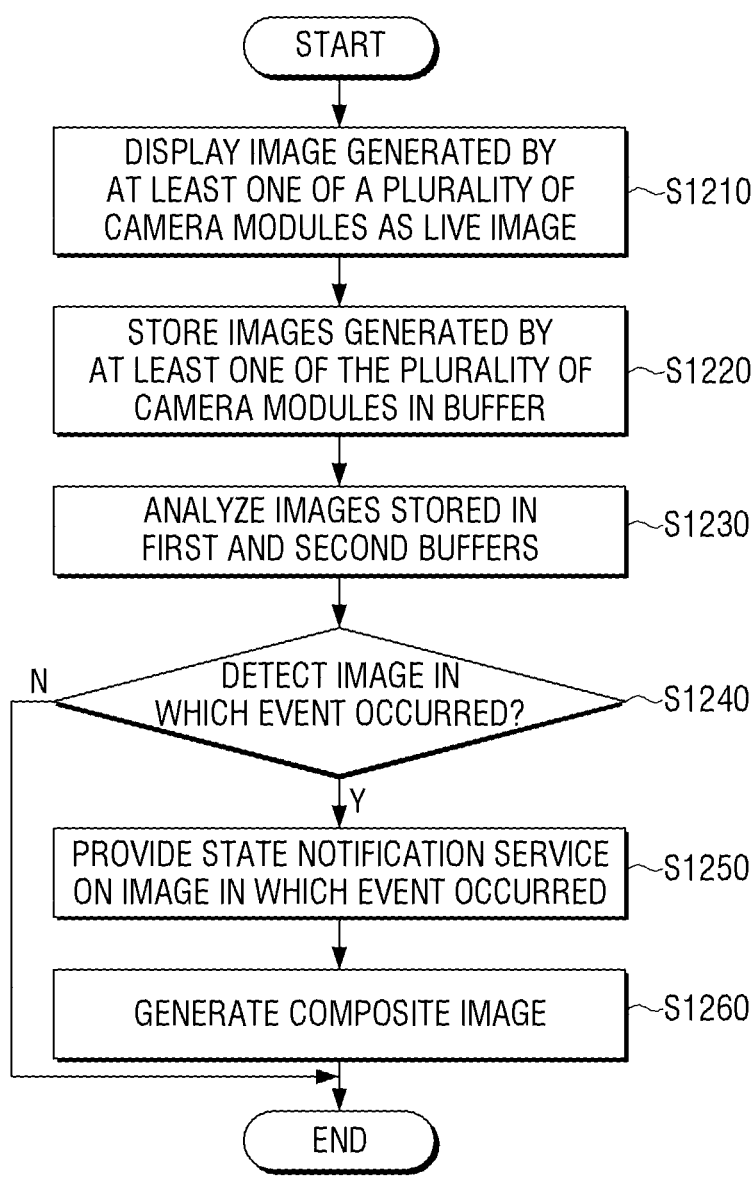
FIG. 12 is a flowchart illustrating an example method for controlling a photographing apparatus.

FIG. 12 is a flowchart illustrating an example method for controlling a photographing apparatus.

As illustrated in FIG. 12, in response to an image being generated by at least one of a plurality of camera modules (e.g., a first camera module and a second camera module), a photographing apparatus displays the generated image in a screen in operation S1210. Before receiving a command relevant to a photographing operation, the photographing apparatus stores the image generated by at least one of the first camera module and the second camera module in a buffer in operation S1220.

For example, in response to images being generated by a plurality of camera modules, the photographing apparatus may display an image generated by the first camera module among the plurality of camera modules as a live image. In addition, before receiving a command relevant to a photographing operation, the photographing apparatus temporarily stores a plurality of images generated by the first camera module in a first buffer. In addition, before receiving a command relevant to a photographing operation, the photographing apparatus temporarily stores a plurality of images generated by the second camera module in a second buffer.

In this case, it may be desirable that the photographing apparatus temporarily stores the images generated by the first and second camera modules in the first and second buffers in a sequential order based on a time sequence. In addition, it may be desirable that the photographing apparatus matches and stores at least one of image information on each image generated by the first and second camera modules and photographing information. In this case, the image information may include, for example, at least one of brightness information, histogram information, and pixel information of an image, and the photographing information may include at least one of lens position information for autofocus, phase difference information, and contrast level information in each camera module in connection with generating an image.

The photographing apparatus analyzes the images stored in the first and second buffers by using at least one of the image information on each image stored in the first and second buffers and the photographing information of the first and second camera modules and determines whether there is an image in which an event occurred in operation S1230. In response to at least one of the images stored in the first and second buffers being detected as an image in which the event occurred based on a determination result, the photographing apparatus provides a state notification service on a camera module relevant to the image in which the event occurred in operations S1240 and S1250.

For example, in response to an event occurring in an image stored in the second buffer based on at least one of the image information of each image stored in the first and second buffers and the photographing information, the photographing apparatus provides a state notification service on the second camera module relevant to the image in which the event occurred.

In this case, the image in which the event occurred may be an image generated by the second camera module while a part of or an entire part of the second camera module is covered with a foreign substance, such as, a finger, or an auto-focused image different from other images stored in the second buffer.

According to an example, in response to the image in which the event occurred being detected, the photographing apparatus may convert and display a live image with respect to the image generated by the first camera module to the image in which the event occurred.

According to another example, in response to the image in which the event occurred being detected, the photographing apparatus may display a live image with respect to the image generated by the first camera module in a first region of a screen and display an event UI with respect to the image in which the event occurred in a second region of the screen. For example, the first region may be a region displayed through a main display, and the second region may be a region displayed through a curved-surface auxiliary display extended in a certain direction from the main display.

For example, in response to the image in which the event occurred being detected, the photographing apparatus may display the live image with respect to the image generated by the first camera module in the first region displayed through the main display and display the image in which the event occurred, that is, the event UI with respect to the image generated by the second camera module, in the second region displayed through, for example, the curved-surface auxiliary display. In this case, the event UI may, for example, be a UI for providing a thumbnail image with respect to the image in the second buffer including the image in which the event occurred or a UI for providing histogram information on the image in the second buffer.

According to another example, in response to the image in which the event occurred being detected, the photographing apparatus may transmit event occurrence-related information to an adjacent terminal apparatus (not shown) which is capable of performing communication with the photographing apparatus. Accordingly, the adjacent terminal apparatus (not shown) may provide a state notification service on the second camera module based on the event occurrence-related information received from the photographing apparatus. According to an example, the adjacent terminal apparatus (not shown) may inform that a photographing operation of the second camera module may be performed abnormally through a notification service such as a vibration feedback, a message alarm feedback, a beep sound feedback, a lamp alarm feedback, etc., based on the event occurrence-related information received from the photographing apparatus.

According to the above-described various example, a user is able to recognize that his/her finger covers a part of or an entire part of the lens of the second camera module, move the finger to another place, and then perform a photographing operation.

In response to a command relevant to a photographing operation being received, the photographing apparatus may photograph images or compose photographed images while no foreign substance exists on the first and second camera modules, in operation S1260.

A more detailed description of a method for generating a composite image from images generated by the first and second camera modules in the photographing apparatus according to an example will be provided below.

Figure 13:
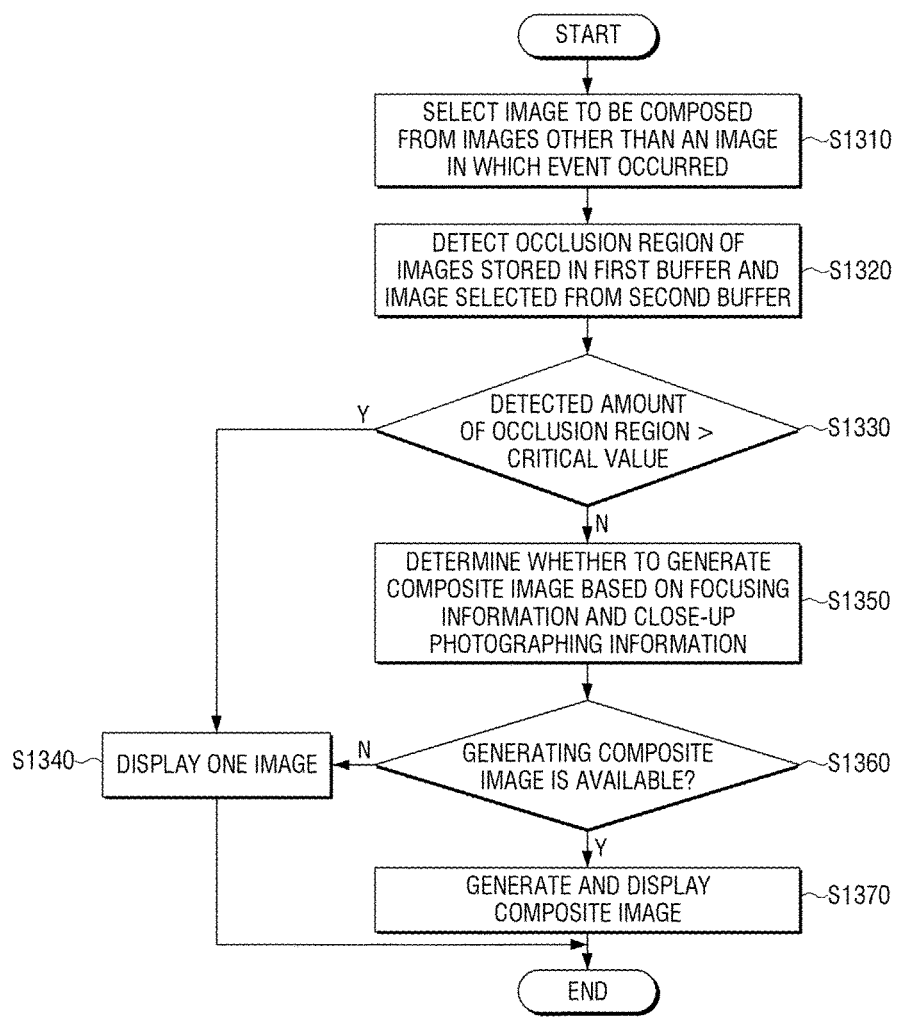
FIG. 13 is a flowchart illustrating an example method for generating a composite image from images generated by a plurality of camera modules in a photographing apparatus.

FIG. 13 is a flowchart illustrating an example method for generating a composite image from images generated in a plurality of camera modules in a photographing apparatus.

As illustrated in FIG. 13, the photographing apparatus may receive a compositeness-related photographing command while at least one of the images stored in the first and second buffers has been detected as an image in which an event occurred. In this case, the photographing apparatus selects an image to be composed from among the images stored in the first and second buffers, excluding the image in which the event occurred, in operation S1310. In response to one of the images stored in the second buffer being detected as the image in which the event occurred, the photographing apparatus may select an image adjacent to the image being detected as the image in which the event occurred as an image to be composed.

In response to the image to be composed being selected, the photographing apparatus may detect an occlusion region based on parallax between the image stored in the first buffer at a point of time when the composite command was received and the image selected from the second buffer, in operation S1320. The photographing apparatus determines whether an amount of the detected occlusion region is greater than a predetermined critical value, in operation S1330. In response to determining that the detected amount of the occlusion region is greater than the predetermined critical value, the photographing apparatus selects one image from among the images stored in the first buffer at the point of time when the composite command was received and the image selected from the second buffer and displays the selected image, in operation S1340.

In response to determining that the detected amount of the occlusion region is less than the predetermined critical value, the photographing apparatus determines whether it is possible to generate a composite image based on focusing information on each of the image stored in the first buffer at the point of time when the compositeness-related user command was received and the image selected from the second buffer and close-up photographing information corresponding to a user command, in operation S1350. In this case, the first camera module may include a wide-angle lens, and the second camera module may include a telephoto lens. Accordingly, a photographable focusing distance may be applied differently to the first camera module and the second camera module according the characteristic of the lens of each module.

Accordingly, the photographing apparatus may determine whether to generate a composite image based on the focusing information on each of the image stored in the first buffer at the point of time when the composite command was received and the image selected from the second buffer and the close-up photographing information corresponding to the command. In response to determining that a composing operation with respect to the image stored in the first buffer at the point of time when the compositeness-related user command was received and the image selected from the second buffer is available, the photographing apparatus generates a composite image from the two images and displays the composite image, in operations S1360 and S1370.

In response to determining that the composing operation is unavailable, the photographing apparatus selects one of the images stored in the first buffer at the point of time when the composite command was received and the image selected from the second buffer based on the above-described operation S1340 and displays the selected image.

The photographing apparatus and method for controlling the same according to various example embodiments described above may be implemented in a program provided to the display apparatus. For example, the program including the portable terminal apparatus and control method may be stored and provided in a non-transitory computer readable medium.

The non-transitory computer readable medium may include a machine-readable medium semi-permanently storing the data. For example, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

As above, various examples have been illustrated and described. The foregoing examples and advantages are merely exemplary and are not to be construed as limiting the disclosure. The teaching can be readily applied to other types of devices. Also, the description of the examples is intended to be illustrative, and not to limit the scope of the claims, and many alternatives, modifications, and variations will be apparent to those skilled in the art.

What is claimed is:

1. A photographing apparatus comprising:
   a plurality of camera modules;
   a first buffer configured to store a plurality of images generated by a first camera module among the plurality of camera modules;
   a second buffer configured to store a plurality of images generated by a second camera module among the plurality of camera modules;
   a display configured to display an image generated by the first camera module as a live image; and
   a controller configured to analyze the images stored in the first buffer and the second buffer using at least one of image information of each image stored in the first buffer and the second buffer and photographing information of the plurality of camera modules, and in response to an event occurring in at least one of the plurality of images stored in the second buffer, to control the display to provide a state notification service on the second camera module.

2. The apparatus as claimed in claim 1, wherein in response to an image in which the event occurred being detected, the controller is configured to control the display to convert and display the image in which the event occurred as the live image.

3. The apparatus as claimed in claim 1, wherein the display comprises:
   a main display; and
   a curved-surface auxiliary display configured to be extended from the main display, wherein in response to the image in which the event occurred being detected, the controller is configured to control the display to display the live image in the main display and to display an event User Interface (UI) with respect to the image in which the event occurred in the curved-surface auxiliary display.

4. The apparatus as claimed in claim 1, further comprising:
communication circuitry configured to perform data communication with an adjacent terminal apparatus,
wherein in response to the image in which the event occurred being detected, the controller is configured to control the communication circuitry to transmit event occurrence-related information to the adjacent terminal apparatus.

5. The apparatus as claimed in claim 1, wherein the image information comprises at least one of: brightness information, histogram information, and pixel information of an image,
wherein the photographing information comprises at least one of: lens position information for autofocus, phase difference information, and contrast level information of at least one of the plurality of camera modules, and
wherein the first buffer and the second buffer match and store the image information of each image and the photographing information.

6. The apparatus as claimed in claim 5, wherein the image in which the event occurred is at least one of: an image generated while at least a part of the second camera module is overlapped with a foreign substance, and an auto-focused image different from other images stored in the first buffer or in the second buffer.

7. The apparatus as claimed in claim 1, wherein the controller is configured to generate a composite image from the images stored in the first buffer and the second buffer and to control the display to display the generated composite image, and
in response to the image in which the event occurred being detected, the controller is configured to generate a composite image from an image adjacent to the image in which the event occurred from among the images stored in the first buffer and the images stored in the second buffer.

8. The apparatus as claimed in claim 7, wherein the controller is configured to detect an occlusion region based on a parallax of each of the images stored in the first buffer and the second buffer and to determine whether to generate the composite image based on whether a detected amount of the occlusion region is greater than a predetermined critical value.

9. The apparatus as claimed in claim 7, wherein the first camera module comprises a wide-angle lens, and the second camera module comprises a telephoto lens, and
wherein the controller is configured to determine whether to generate the composite image based on focusing information of each of the first camera module and the second camera module and close-up photographing information corresponding to a command.

10. A method for controlling a photographing apparatus having a plurality of camera modules, comprising:
displaying an image generated by a first camera module among the plurality of camera modules as a live image;
storing images generated by the first camera module in a first buffer and storing images generated by a second camera module among the plurality of camera modules in a second buffer;
analyzing the images stored in the first buffer and the second buffer using at least one of: image information of each image stored in the first buffer and the second buffer and photographing information of the plurality of camera modules; and
providing, in response to an event occurring in at least one of the plurality of images stored in the second buffer, a state notification service on the second camera module.

11. The method as claimed in claim 10, wherein in response to an image in which the event occurred being detected, the providing comprises converting and displaying the image in which the event occurred as the live image.

12. The method as claimed in claim 10, wherein in response to the image in which the event occurred being detected, the providing comprises displaying the live image in a main display and displaying an event User Interface (UI) with respect to the image in which the event occurred in a curved-surface auxiliary display extending from the main display.

13. The method as claimed in claim 10, wherein in response to the image in which the event occurred being detected, the providing comprises transmitting event occurrence-related information to an adjacent terminal apparatus.

14. The method as claimed in claim 10, wherein the image information comprises at least one of: brightness information, histogram information, and pixel information of an image,
wherein the photographing information comprises at least one of: lens position information for autofocus, phase difference information, and contrast level information of at least one of the plurality of camera modules, and
wherein the first buffer and the second buffer match and store the image information of each image and the photographing information.

15. The method as claimed in claim 14, wherein the image in which the event occurred is at least one of: an image generated while at least a part of the second camera module is overlapped with a foreign substance, and an auto-focused image different from other images stored in the first buffer or in the second buffer.

16. The method as claimed in claim 10, further comprising:
determining whether to generate a composite image from the images stored in the first buffer and the second buffer based on a received command; and
generating a composite image from the images stored in the first buffer and the second buffer based on a determination result and displaying the generated composite image,
wherein in response to the image in which the event occurred being detected, the displaying comprises generating and displaying a composite image from an image adjacent to the image in which the event occurred from among the images stored in the first buffer and the images stored in the second buffer.

17. The method as claimed in claim 16, wherein the determining comprises detecting an occlusion region based on a parallax of each of the images stored in the first buffer and the second buffer, and determining whether to generate the composite image based on whether a detected amount of the occlusion region is greater than a predetermined critical value.

18. The method as claimed in claim 16, wherein the first camera module comprises a wide-angle lens, and the second camera module comprises a telephoto lens,
wherein the determining comprises determining whether to generate the composite image based on focusing information of each of the first camera module and the second camera module and close-up photographing information corresponding to a command.

19. A photographing apparatus comprising:
a first buffer configured to store a plurality of images generated by a first camera module among a plurality of camera modules;
a second buffer configured to store a plurality of images generated by a second camera module among the plurality of camera modules;
a display configured to display an image generated by the first camera module as a live image; and
a controller configured to generate a composite image from the images stored in the first buffer and the second buffer based on a command and to control the display to display the generated composite image,
wherein the controller is configured to analyze the images stored in the first buffer and the second buffer using at least one of image information of each image stored in the first buffer and the second buffer and photographing information of the plurality of camera modules and in response to an event occurring in at least one of the plurality of images stored in the second buffer, to generate a composite image from images other than an image in which the event occurred and the images stored in the first buffer.

20. The apparatus as claimed in claim 19, wherein in response to the image in which the event occurred being detected, the controller is configured to generate a composite image from an image adjacent to the image in which the event occurred from among the images stored in the first buffer and the images stored in the second buffer and to control the display to display the generated composite image.

* * * * *